Patented Aug. 5, 1930

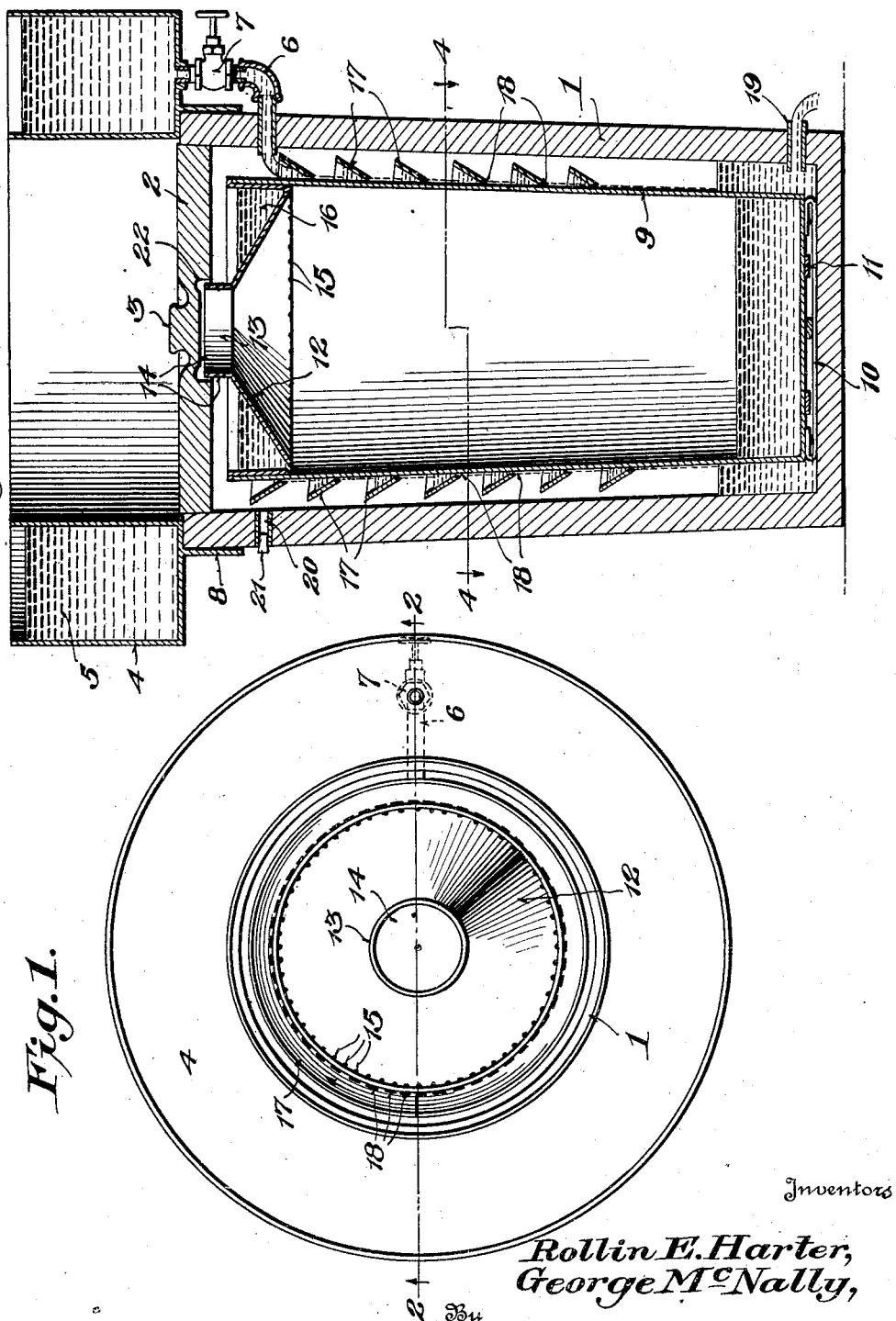

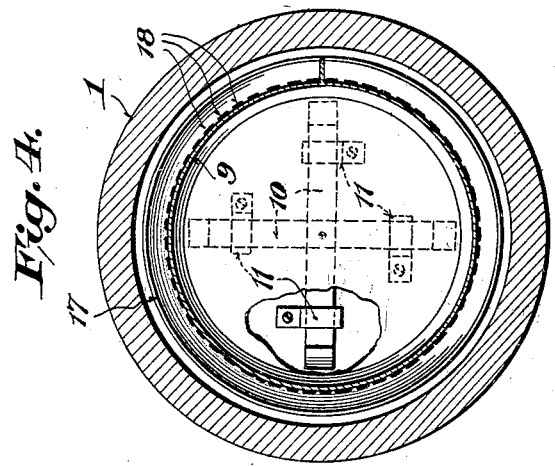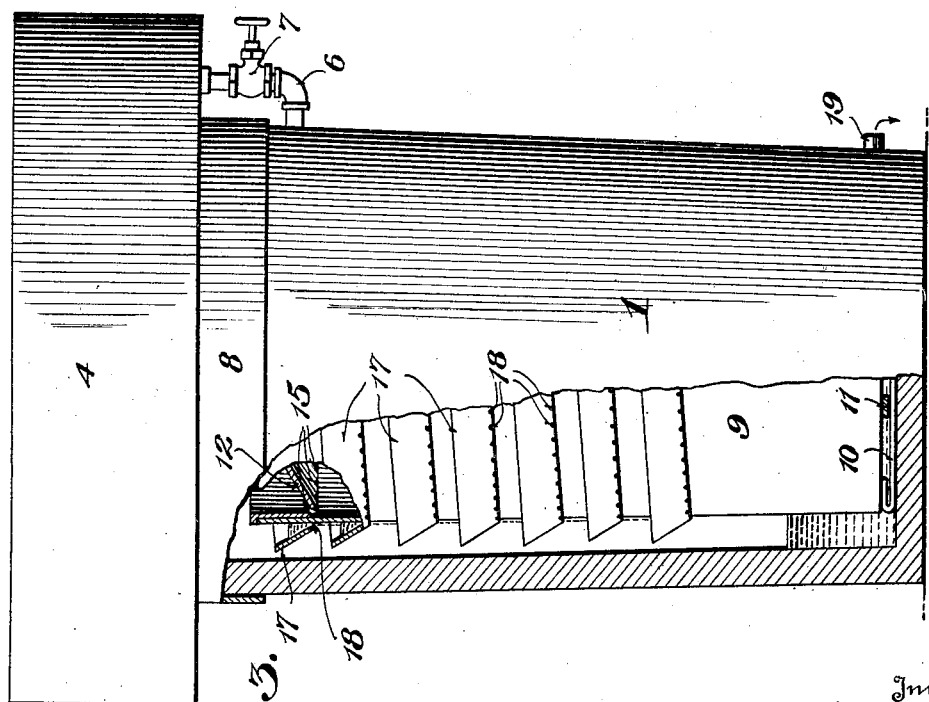

1,772,145

UNITED STATES PATENT OFFICE

ROLLIN E. HARTER, OF GREENVILLE, AND GEORGE McNALLY, OF NEW CASTLE, PENNSYLVANIA

CREAM COOLER

Application filed August 31, 1927. Serial No. 216,628.

Our invention relates to new and useful improvements in a cooler and more particularly to a cream cooler, the principal object of the invention residing in the provision of a device wherein not only may the cream be cooled but which holds the cream and will keep the same cool for such a time as is necessary or until it is to be used.

Another object of the invention resides in the provision of a cooler of the character described in which the cream is delivered into a container in the form of a spray or film and in which the cooling medium, such as water, is circulated around the container to readily cool the cream.

A further object of the invention resides in the provision of a cooler in which there is an outer receptacle and an inner container, the container being adapted to receive the cream and provided with troughs for conveying the cooling medium which is supplied from a tank supported upon the receptacle, the container having a cover in the form of a trough in which the cream is initially placed to be sprayed or discharged in the form of a film into the container and a cover being provided for the outer receptacle to enclose the container.

With the above and other objects in view which will appear as the description proceeds, our invention consists in the novel details of construction, and arrangement of parts, described in the following specification and illustrated in the accompanying drawings, and while we have illustrated and described the preferred embodiments of the invention, as they now appear to us, it will be understood that such changes may be made as will fall within the scope of the appended claims.

In the drawings:

Fig. 1 is a top plan with the receptacle cover removed.

Fig. 2 is a transverse vertical section on the line 2—2 of Fig. 1.

Fig. 3 is a side elevation with parts broken away; and

Fig. 4 is a horizontal section on the line 4—4 of Fig. 2.

In the drawings 1 indicates the outer receptacle, preferably of wood, and 2 the removable cover provided with the knob 3 whereby the same may be readily placed in position or removed. Supported upon the top of the receptacle 1 is a tank 4 for receiving the cooling medium, such as water, 5, the cooling medium being discharged from the tank, into the receptacle, through the pipe 6 having the valve 7. The tank 4 is provided with the depending flange 8 which encircles the upper edge of the receptacle 1 as more particularly illustrated in Fig. 2 of the drawings.

Received within the receptacle 1 is a metal container 9 having the cross bars 10 secured to the bottom thereof and adapted to be engaged with the cleats 11 secured to the bottom of the receptacle. By reference to Fig. 2 of the drawings it will be seen that the cross bars 10 are slightly spaced from the bottom of the container and by a slight rotation of the container within the receptacle the cross bars may be either disengaged from or engaged with the cleats 11 as desired. When disengaged from the cleats the container may be easily removed from the receptacle and when engaged with the cleats the container is properly positioned within the receptacle to leave a space between the receptacle and container.

A cover 12 is provided for the container 9, and as shown more particularly in Fig. 2 of the drawings, is in the form of a trough having the central opening 13 around which is an upwardly extending flange 14. Perforations 15 are formed in the bottom of the trough cover, adjacent the edge thereof, and cream 16, or other liquid to be cooled, is placed in the trough-like cover and will be sprayed through the perforations 15 into the container. The cream spraying through the perforations will fall into the container in the form of a film along the inner wall of the container. A spiral trough 17 is formed around or secured to the outside of the container 9 and is provided, adjacent the wall of the container, with spaced perforations 18 for a purpose which will be presently brought out. A discharge opening is formed adjacent the bottom of the receptacle 1 as shown at 19 and may be closed with a suitable plug when it is not desired to discharge or drain the cooling medium from the receptacle. A vent 20 is provided adjacent the upper end of the receptacle 1 and may be closed, when desired, by the plug 21.

The cover 2 for the receptacle 1 is provided on the bottom surface with the recess 22 to receive the flange 14 of the trough-like cover 12 of the container 9.

Having fully described the detailed construction of our cooler we will now endeavor to more clearly set forth the operation. The cream to be cooled is placed in the trough-like cover 12 of the container 9 and will be discharged through the perforations 15 along the inner surface or wall of the container in the form of a film. The cooling medium such as water is placed in the trough 4 and is discharged through the pipe 6, when the valve 7 is opened, to be discharged into the inclined tank 4 formed on or secured to the outer face of the container. Some of the water discharged into the trough will circulate around the container, due to the incline of the trough, while a certain amount of the water will be discharged through the openings 18 and fall in the form of a film over the wall of the container. It will thus be seen that the cream which is falling in the form of a film over the inner wall of the container will be readily cooled due to the fact that the cooling medium such as water is not only circulating around the container, through the trough, but is falling through the openings in the trough to form a film around the outer wall of the container. While the cream is being cooled, or after cooled and received in the container, the cover 2 may be placed in position and the flange 14, of the trough-like cover 12, will enter the recess formed in the under surface of the cover 2. The cream which has been cooled may be retained in the container in its cooled condition until desired for use. As shown more particularly in Fig. 2 of the drawings the container 9 is spaced from the inner wall of the receptacle 1 to form an air space between the receptacle and container. This air space acts as an insulator for the container against outside temperatures.

Having fully described our invention what we claim as new and desire to secure by Letters Patent is:

1. A cooler of the character described including a container, means for discharging the material to be cooled into the container, a perforated spiral trough on the exterior of the container, and means for supplying a cooling medium to the trough.

2. A cooler of the character described including a container, means for discharging the material to be cooled into the container in the form of a film along the inner wall thereof, and means for circulating a cooling medium circumferentially around the container and in the form of a film over the outer wall thereof.

3. A cooler of the character described including a container, means for discharging the material to be cooled into the container, and means for circulating the cooling medium circumferentially around the container from the top to the bottom and discharging a portion thereof over the outer face of the container in the form of a film.

4. A cooler of the character described including an outer receptacle, a container therein, a cover for the receptacle, a trough-like cover for the container for receiving the material to be cooled and discharge the same into the container, and a tank supported upon the receptacle for receiving the cooling medium and discharging the same around the container, said tank having a central opening through which the cover of the receptacle, the cover of the container, and the container may be removed.

In testimony whereof we hereunto affix our signatures.

ROLLIN E. HARTER.
GEORGE McNALLY.